(12) United States Patent
Wolf et al.

(10) Patent No.: US 12,734,851 B2
(45) Date of Patent: Sep. 15, 2026

(54) TRAILER HITCH AND TRAILER HITCH SYSTEM

(71) Applicant: Rivian IP Holdings, LLC, Irvine, CA (US)

(72) Inventors: Philipp Josef Wolf, Dana Point, CA (US); Raghav Jaswal, Coventry (GB); Barry Lett, Chobham (GB); Mark Andrew Jones, Shoreham-by-Sea (GB); James John Alexander Dowle, Laguna Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 526 days.

(21) Appl. No.: 18/323,839

(22) Filed: May 25, 2023

(65) Prior Publication Data

US 2024/0391282 A1 Nov. 28, 2024

(51) Int. Cl.
*B60D 1/54* (2006.01)
*B60D 1/06* (2006.01)

(52) U.S. Cl.
CPC ................. *B60D 1/54* (2013.01); *B60D 1/06* (2013.01); *B60D 2001/544* (2013.01)

(58) Field of Classification Search
CPC ............................ B60D 1/54; B60D 2001/544
See application file for complete search history.

(56) References Cited

U.S. PATENT DOCUMENTS 7,793,967 B2 * 9/2010 McConnell .............. B60D 1/06 280/491.1
9,387,739 B2 * 7/2016 Babuska .................. B60D 1/52
12,036,831 B2 * 7/2024 Shaeff .................... B60D 1/485

FOREIGN PATENT DOCUMENTS

WO WO-2023280954 A1 * 1/2023 ............... B60D 1/06
WO WO-2024025959 A1 * 2/2024 ............... B60D 1/54

* cited by examiner

*Primary Examiner* — Kevin Hurley
(74) *Attorney, Agent, or Firm* — Patterson + Sheridan, LLP

(57) ABSTRACT

A vehicle hitch and a vehicle hitch system are provided. The vehicle hitch includes a frame, a receiver, a mount, a receiver locking mechanism and a mount locking mechanism. The frame is configured to be mounted to a vehicle member. The receiver includes an upper body rotatably coupled to the frame, and a lower body that defines an opening and an inner cavity. The mount is slidingly disposed within the inner cavity. The receiver locking mechanism is configured to secure the receiver in stowed and deployed positions with respect to the frame. The mount locking mechanism is configured to secure the mount in retracted and extended positions with respect to the receiver. The vehicle hitch system includes a vehicle hitch and a vehicle bumper that includes a cover that defines an opening, and a motorized panel configured to cover and uncover the opening.

13 Claims, 11 Drawing Sheets

120
123
124
128
126
122
FIG. 1B 120
123
124
128
122
FIG. 1C

120
Vertical Axis
Horizontal Axis
123
124
128
200
122
FIG. 1D

TRAILER HITCH AND TRAILER HITCH SYSTEM

INTRODUCTION

The present disclosure relates to vehicles. More particularly, the present disclosure relates to trailer hitches and trailer hitch systems for vehicles.

SUMMARY

Embodiments of the present disclosure advantageously provide a trailer hitch that includes a frame, a receiver, a mount, a receiver locking mechanism and a mount locking mechanism. The frame is configured to be mounted to a vehicle member. The receiver includes an upper body rotatably coupled to the frame, and a lower body that defines an opening and an inner cavity. The mount is slidingly disposed within the inner cavity. The receiver locking mechanism is configured to secure the receiver in stowed and deployed positions with respect to the frame. The mount locking mechanism is configured to secure the mount in retracted and extended positions with respect to the receiver.

Embodiments of the present disclosure also provide a trailer hitch system that includes a trailer hitch and a vehicle bumper. The trailer hitch includes a frame, a receiver and a mount. The frame is configured to be mounted to a vehicle member. The receiver is attached to the frame, and has a stowed position and a deployed position. The mount is coupled to the receiver. The vehicle bumper includes a cover, and a motorized panel. The cover is configured to be attached to the vehicle member, and includes a lower portion defining an opening through which the mount extends in the deployed position. The motorized panel is configured to cover and uncover the opening, and has a closed position and an open position.

BRIEF DESCRIPTION OF THE DRAWINGS

FIGS. 1B, 1C, 1D depict illustrations of a portion of a rear end of the example electric vehicle, in accordance with embodiments of the present disclosure.

DETAILED DESCRIPTION

Figure 1A:
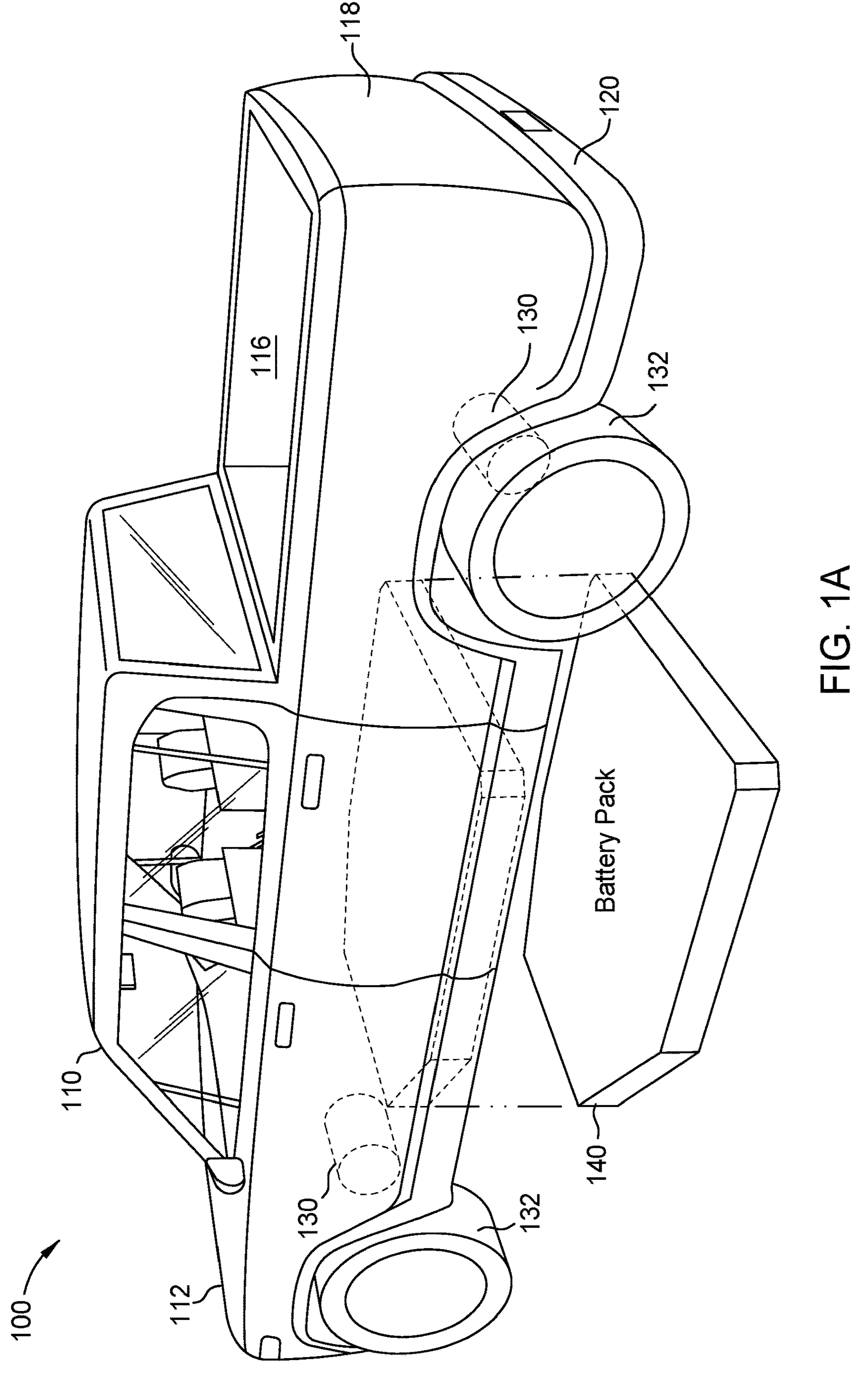
FIG. 1A depicts an illustration of an example electric vehicle, in accordance with embodiments of the present disclosure.

A trailer hitch connects a vehicle to, for example, a trailer, such as an open-air trailer, an enclosed trailer, a travel trailer, etc., for towing. Trailer hitches may be used for other purposes as well, such as providing a vehicle mount for a bicycle rack, a platform, a spare tire carrier, a cargo carrier, etc. Generally, a trailer hitch may also be known as a vehicle hitch. A trailer hitch typically includes a receiver mounted to the rear bumper, frame, member, etc. of the vehicle, and a ball mount that extends from the receiver. The trailer includes a tongue that extends from the front of the trailer. The tongue has a ball coupler that connects to the ball mount of the trailer hitch.

Generally, the ball mount interferes with the ability of the vehicle to traverse inclined surfaces by reducing the vehicle's departure angle, i.e., the maximum angle with respect to the horizontal plane that the vehicle can climb without damage.

Some trailer hitches have retractable ball mounts that rotate about a vertical axis. Unfortunately, these trailer hitches require a large rectangular opening in the lower rear bumper cover to receive the entire length of the ball mount. While a retractable ball mount may mitigate the reduction in the departure angle noted above, the large rectangular opening in lower rear bumper cover allows debris buildup behind the bumper cover and increases aerodynamic drag.

Embodiments of the present disclosure advantageously provide a trailer hitch that is mounted to the reinforcement bar of the bumper or other suitable vehicle member that is disposed behind the bumper cover. The trailer hitch includes a frame, a receiver, a mount, a receiver locking mechanism and a mount locking mechanism. The frame is configured to be mounted to the vehicle member. The receiver includes an upper body rotatably coupled to the frame, and a lower body that defines an opening and an inner cavity. The mount is slidingly disposed within the inner cavity. The receiver locking mechanism is configured to secure the receiver in stowed and deployed positions with respect to the frame. The mount locking mechanism is configured to secure the mount in retracted and extended positions with respect to the receiver. The mount may include a trailer ball attached to an end, a rack for a bicycle, a stowage container, etc.

In many embodiments, the frame includes two support brackets, the receiver is coupled to the support brackets using a rotational coupling, such as a pin, a bearing, etc., and the receiver rotates in a vertical plane about the horizontal axis. The receiver locking mechanism includes a body and a locking pin. The body has a lever and a cam surface, and defines an opening proximate to (e.g., near, adjoining, close to, adjacent to, etc.) the cam surface. The locking pin is displaceable within the opening, and has a shoulder that engages the cam surface. During rotation of the first locking mechanism, the cam surface displaces the locking pin in a direction parallel to a horizontal axis.

In many embodiments, each support bracket includes a contact surface that defines an opening, and the receiver includes a first contact surface that defines a recess and a second contact surface that defines a recess. The first contact surface of the receiver is associated with the stowed position, while the second contact surface of the receiver is associated with the deployed position. In the stowed position, the locking pin is configured to engage the contact surfaces in each support bracket and the first contact surface of the receiver. In the deployed position, the locking pin is configured to engage the contact surfaces in each support bracket and the second contact surface of the receiver.

Embodiments of the present disclosure also provide a trailer hitch system that includes a trailer hitch and a vehicle bumper. The trailer hitch includes a frame, a receiver and a mount. The frame is configured to be mounted to a vehicle member. The receiver is attached to the frame, and has a stowed position and a deployed position. The mount is coupled to the receiver. The vehicle bumper includes a cover, and a motorized panel. The cover is configured to be attached to the vehicle member, and includes a lower portion defining an opening through which the mount extends in the deployed position. The motorized panel is configured to cover and uncover the opening, and has a closed position and an open position.

Embodiments of the present disclosure advantageously facilitate ground clearance, provide an advantageous maximum departure angle when the vehicle is traversing an inclined surface, and prevent debris buildup within the space behind the bumper cover. Additionally, many embodiments of the present disclosure provide advantageous aerodynamic effects when the trailer hitch is stowed and the motorized panel is closed, as well as when the ball mount is deployed and the motorized panel is open or partially closed.

FIG. 1A depicts an example of electric vehicle 100, in accordance with embodiments of the present disclosure.

Electric vehicle 100 includes, inter alia, a body, a propulsion system, an energy storage system, an auxiliary or accessory system, etc. Body 110 includes, inter alia, a frame or chassis, front end 112, driver/passenger compartment or cabin 114, trunk or bed 116, rear end 118, rear bumper 120 that defines an opening protected by a motorized panel, a frunk, stowage compartments, etc. Rear bumper 120 includes a cover, a reinforcement bar, an absorber and a mount or mounting system.

The propulsion system includes, inter alia, one or more electronic control units (ECUs), one, two or four (or more) electric motors 130 with associated transmissions and drivetrains, a suspension subsystem, a steering subsystem, wheels 132, etc. The energy storage system includes, inter alia, one or more ECUs, battery pack 140, a vehicle charging subsystem including the charging port, etc. The auxiliary or accessory system includes, inter alia, one or more ECUs, an electrical power distribution system, a heating and air conditioning system, cabin displays, interior and exterior lighting systems, integrated electrical devices, etc.

Figures 1B, 1C, 1D:
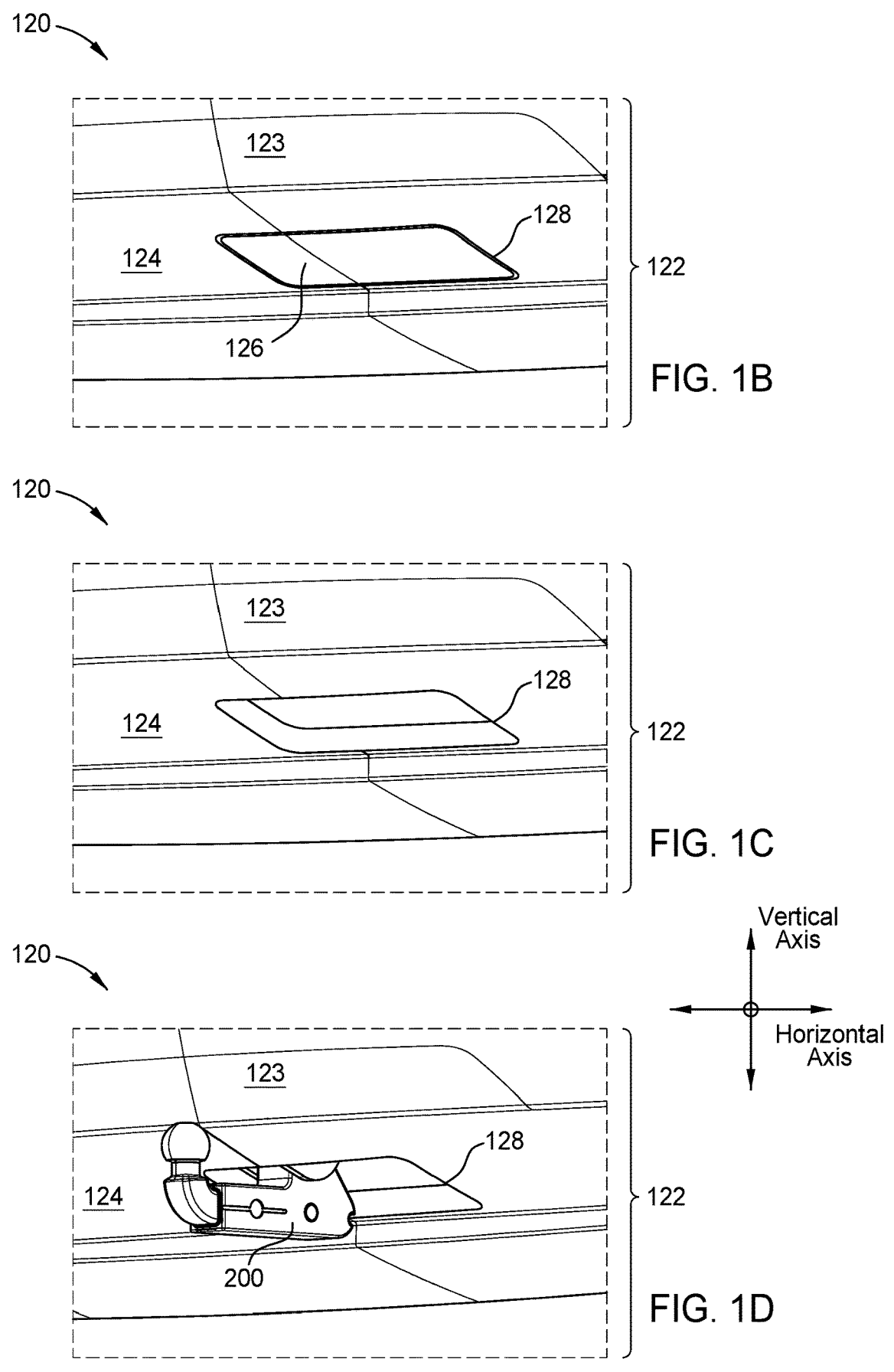

FIGS. 1B, 1C, 1D illustrate a portion of rear bumper 120 of electric vehicle 100, in accordance with embodiments of the present disclosure. Vertical and horizontal axes are identified for reference purposes.

Rear bumper 120 includes, inter alia, cover 122 which includes upper portion 123, cover lower portion 124 and motorized panel 126. Cover upper portion 123 is disposed in front of the reinforcement bar and is substantially parallel to the vertical axis, while cover lower portion 124 is disposed beneath the reinforcement bar and is substantially parallel to the horizontal axis.

Cover lower portion 124 defines opening 128 for trailer hitch 200. Motorized panel 126 covers (e.g., closes, shuts, seals, etc.) opening 128 when trailer hitch 200 is stowed (FIG. 1B), and uncovers (e.g., opens, unseals, etc.) opening 128 prior to (or during) trailer hitch 200 deployment (FIG. 1C). In many embodiments, motorized panel 126 remains open (e.g., uncovers opening 128) after trailer hitch 200 has been deployed (FIG. 1D). In certain embodiments, trailer hitch 200 may need a larger opening 128 through cover lower portion 124 during deployment than after deployment. For example, trailer hitch 200 may rotate through a vertical plane that is skewed with respect to reinforcement bar 121, such as a 45° skewed vertical plane (as depicted in FIGS. 3A, 3B, 3C, 4A, 4B). Accordingly, after trailer hitch 200 has been deployed, motorized panel 126 may partially close in order to partially cover opening 128.

Figure 2A:
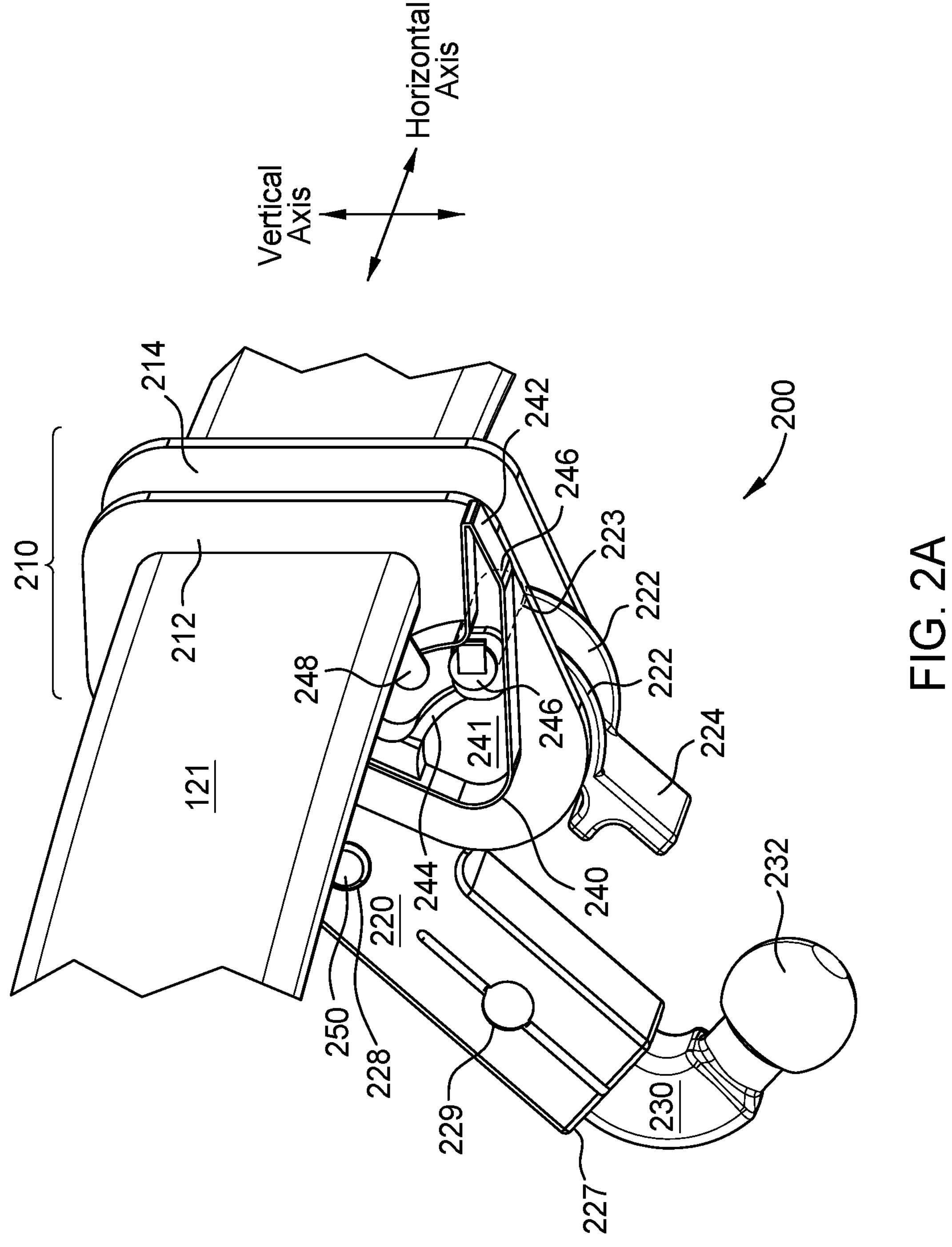
FIGS. 2A, 2B and 2C depict front perspective views of an example trailer hitch, in accordance with embodiments of the present disclosure.
Figure 2B:
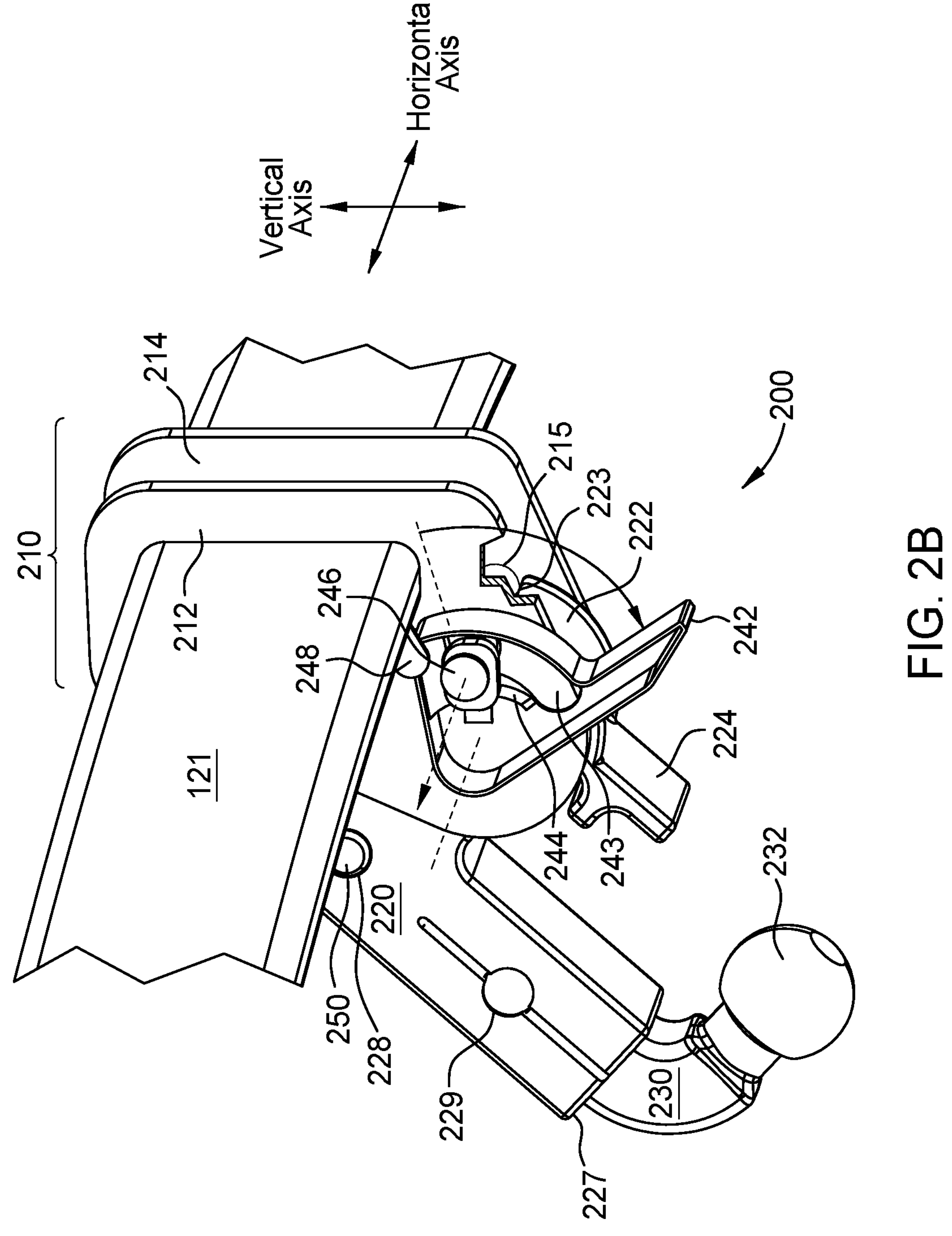
Figure 2C:
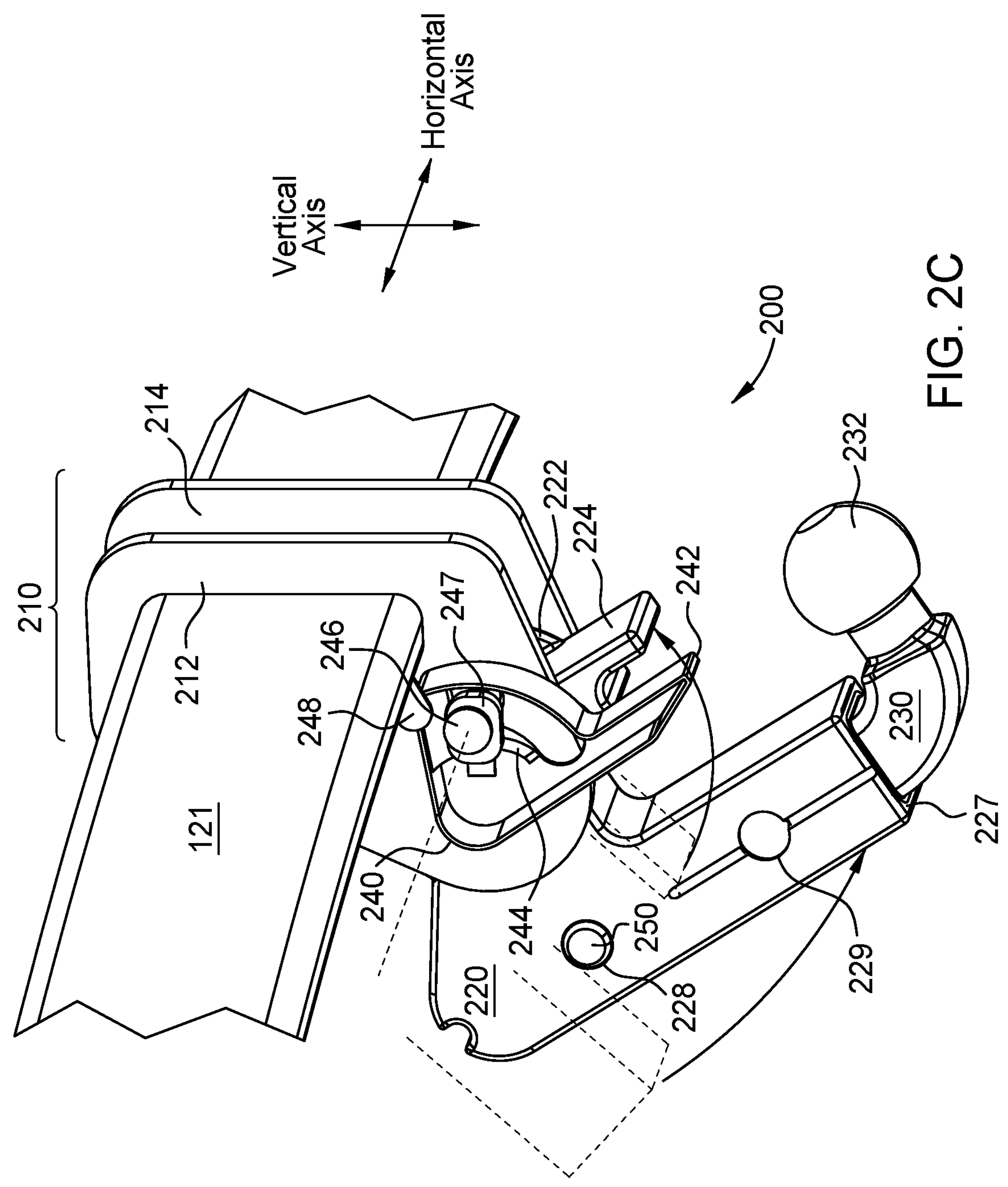

FIGS. 2A, 2B and 2C depict front perspective views of trailer hitch 200, in accordance with embodiments of the present disclosure.

Trailer hitch 200 includes, inter alia, frame 210, receiver 220, mount 230, receiver locking mechanism 240 and mount locking mechanism 250. Vertical and horizontal axes are identified for reference purposes.

Frame includes bracket 212 and bracket 214. Bracket 212 includes contact surface 213 (identified in FIG. 2F) that defines an opening to accept locking pin 246 of receiver locking mechanism 240. Similarly, bracket 214 includes contact surface 215 that defines an opening to accept locking pin 246 of receiver locking mechanism 240. Generally, frame 210 may be mounted to a suitable vehicle member that is disposed behind cover upper portion 123 and above cover lower portion 124. In many embodiments, frame 210 is mounted to reinforcement bar 121 of rear bumper 120. Rotational coupling 216 (identified in FIG. 2F), such as a pin, a bearing, etc., couples receiver 220 to frame 210 to enable receiver 220 to rotate in a vertical plane about the horizontal axis.

Figure 2D:
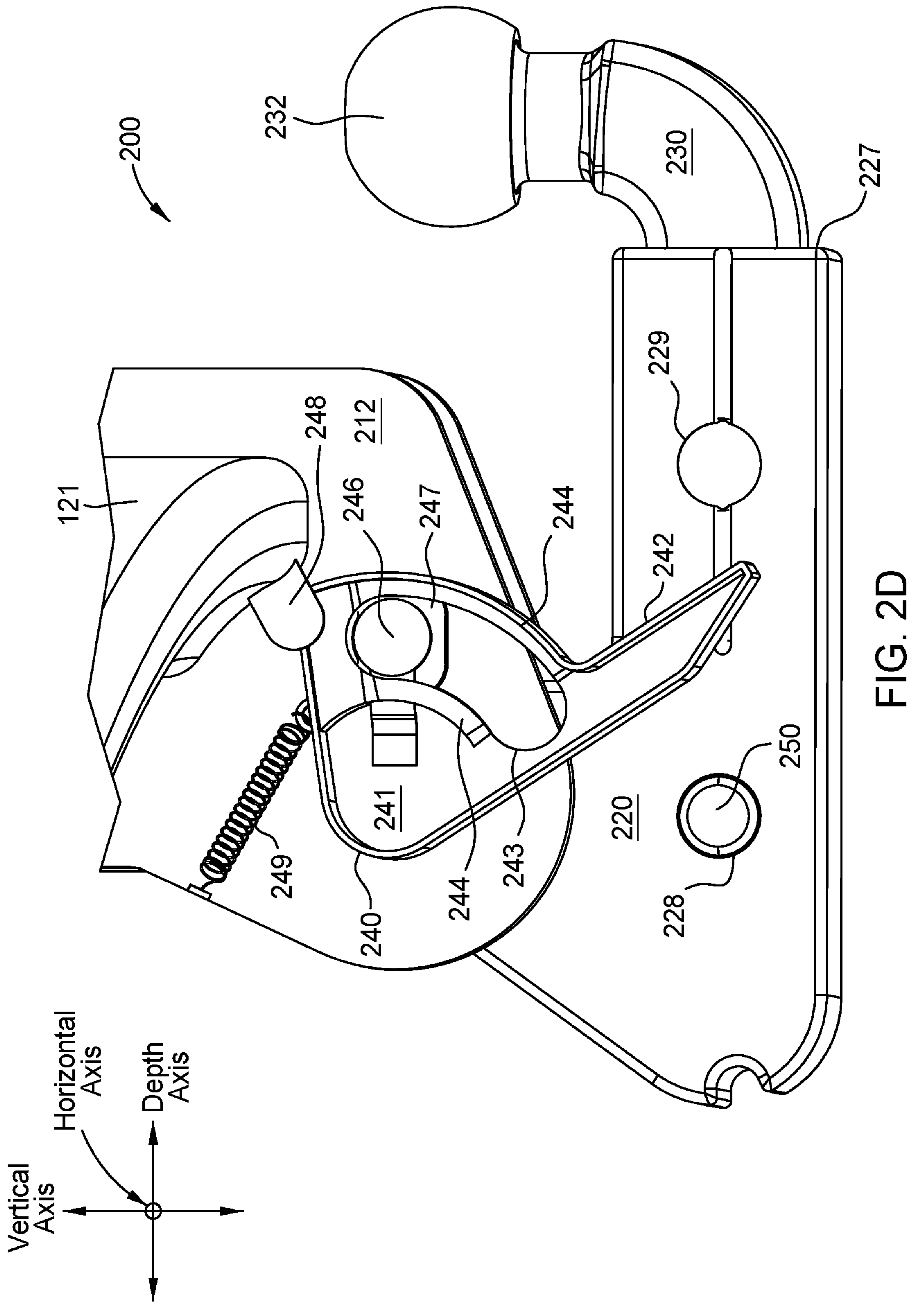
FIGS. 2D and 2E depict left side views of the example trailer hitch, in accordance with embodiments of the present disclosure.
Figure 2E:
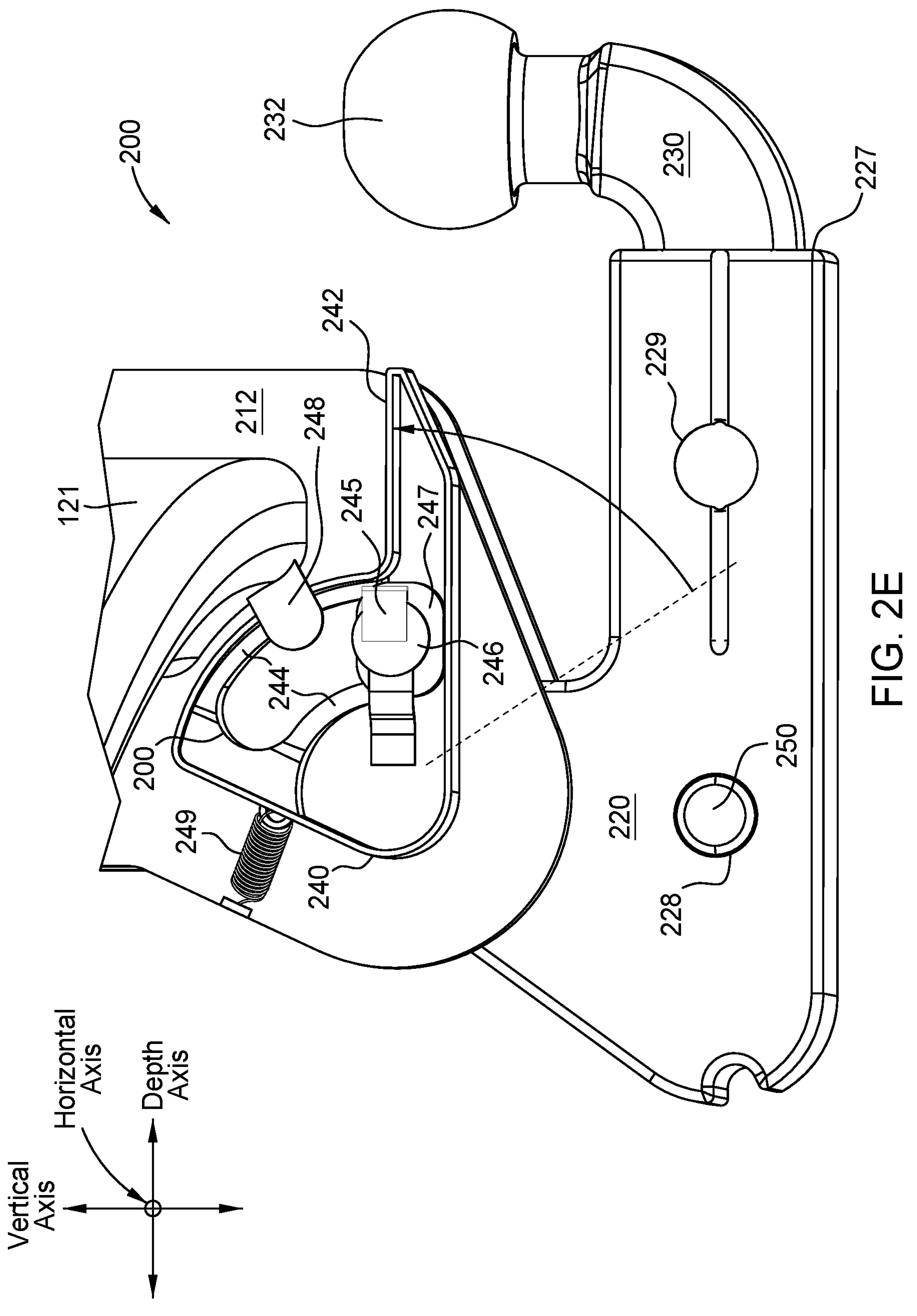
Figure 2F:
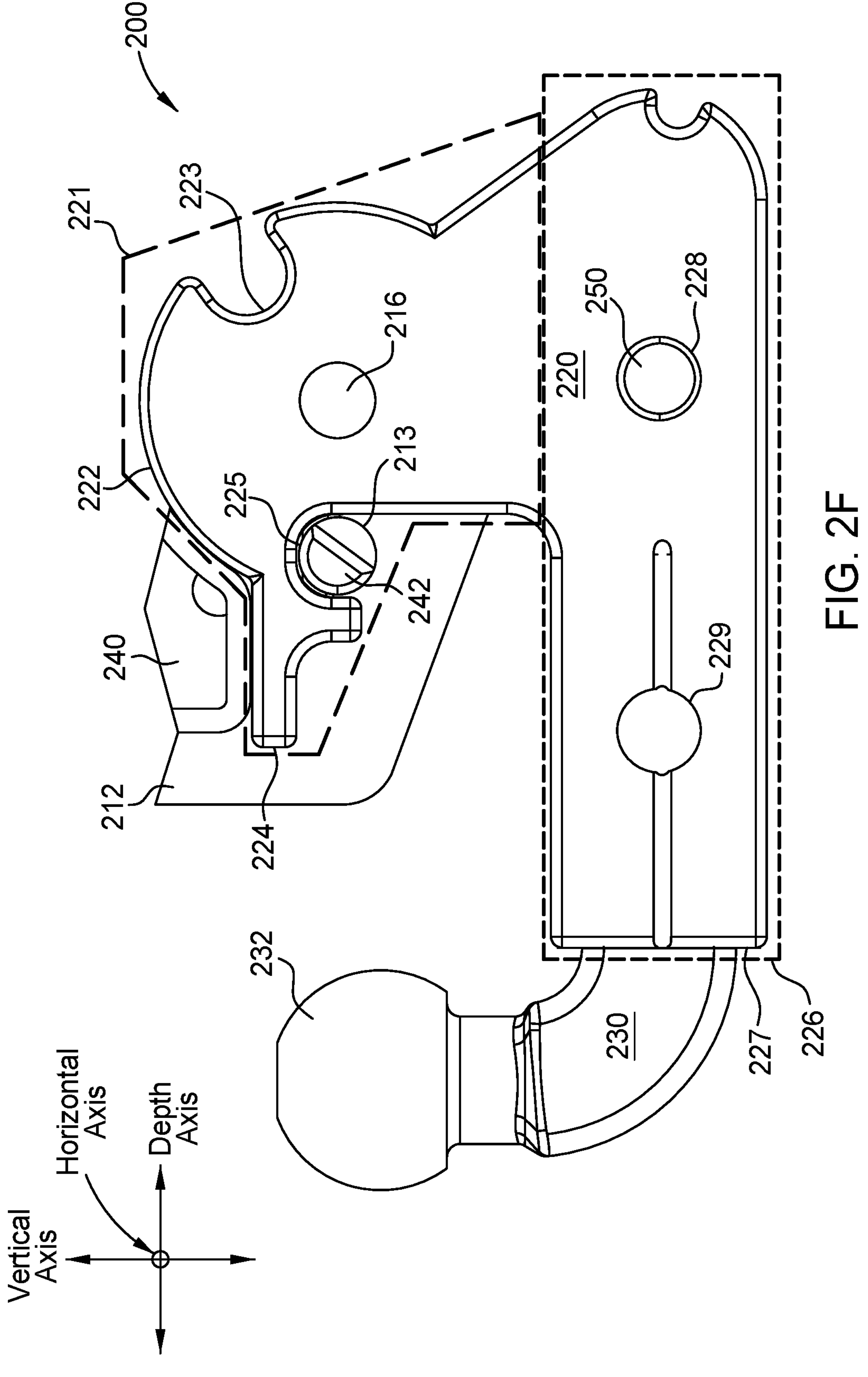
FIG. 2F depicts a right side view of the example trailer hitch, in accordance with embodiments of the present disclosure.

Receiver 220 includes upper body 221 (identified in dashed outline in FIG. 2F) and lower body 226 (identified in dashed outline in FIG. 2F).

Upper body 221 includes a pair of shoulders 222, lever 224, and contact surface 225 (identified in FIG. 2F). Each shoulder 222 includes contact surface 223, and each contact surface 223 defines a recess to accept locking pin 246 of receiver locking mechanism 240. Similarly, contact surface 225 defines a recess to accept locking pin 246 of receiver locking mechanism 240.

Lower body 226 includes edge 227, contact surface 228, and contact surface 229. Edge 227 defines an opening leading to an inner cavity that accepts mount 230. Contact surface 228 defines an opening to accept mount locking mechanism 250. Similarly, contact surface 229 defines an opening to accept mount locking mechanism 250. Contact surface 228 is associated with a locked retracted position for mount 230, while contact surface 229 is associated with a locked extended position for mount 230.

Generally, mount 230 includes an end effector. In many embodiments, the end effector is a ball 232 for coupling electric vehicle 100 to a trailer, such as a 2 inch diameter ball, a 1⅞ inch diameter ball, a 2$\frac{5}{16}$ diameter ball, etc. In other embodiments, the end effector may be a bicycle rack, a platform, a spare tire carrier, a cargo carrier, etc. When installed, mount 230 is slidingly disposed within the inner cavity of lower body 226 between the locked retracted position and the locked extended position. In many embodiments, mount 230 may be completely removed from lower body 226 of receiver 220.

Receiver locking mechanism 240 includes body 241, lever 242, cam surface 244, locking pin retention tab 245 (identified in FIG. 2E), locking pin 246, locking pin shoulder 247, body retention tab 248, and spring 249 (such as a coil spring identified in FIGS. 2D, 2E). Body 241 defines opening 243 to accept locking pin 246.

When receiver 220 is disposed in the locked stowed position (FIG. 2A), locking pin 246 passes through opening 243 and engages contact surface 213, contact surfaces 223 and contact surface 215. Locking pin 246 does not engage contact surface 225.

When receiver 220 is disposed in the unlocked stowed position (FIG. 2B), locking pin shoulder 247 engages cam surface 244, and locking pin 246 is disposed within opening 243. Locking pin 246 may (or may not) engage contact surface 213, but does not engage contact surfaces 223, contact surface 215 or contact surface 225.

When receiver 220 is disposed in an unlocked intermediate position during deployment (FIG. 2C), locking pin shoulder 247 engages cam surface 244, and locking pin 246 is disposed within opening 243. Locking pin 246 may (or may not) engage contact surface 213, but does not engage contact surfaces 223, contact surface 215 or contact surface 225.

When receiver 220 is disposed in the unlocked deployed position (FIG. 2D), locking pin shoulder 247 engages cam surface 244, and locking pin 246 is disposed within opening 243. Locking pin 246 may (or may not) engage contact surface 213, but does not engage contact surfaces 223, contact surface 215 or contact surface 25.

When receiver 220 is disposed in the locked deployed position (FIG. 2E, 2F, 2G), locking pin 246 passes through opening 243 and engages contact surface 213, contact surface 225 and contact surface 215. Locking pin 246 does not engage contact surfaces 223.

Mount locking mechanism 250 may be a spring-loaded pin, etc. When mount 230 is disposed in the locked retracted position (FIGS. 2A, 2B, 2C, 2D, 2E, 2F), mount locking mechanism 250 engages contact surface 228. Similarly, when mount 230 is disposed in the locked extended position (FIG. 2G), mount locking mechanism 250 engages contact surface 229.

Generally, to transition mount 230 from the locked retracted position to the locked extended position, mount locking mechanism 250 is disengaged, mount 230 is moved from the retracted to the extended position, and then mount locking mechanism 250 is engaged. To remove mount 230 from receiver 220, after mount 230 is disposed in the locked extended position, mount locking mechanism 250 is disengaged and then mount 230 is simply removed from the inner cavity of lower body 226.

For example, mount locking mechanism 250 may be disengaged from contact surface 228 by depressing or pushing in the spring-loaded pin and sliding mount 230 along the inner cavity of lower body 226 until the spring-loaded pin disengages from contact surface 228. When the spring-loaded pin reaches the opening defined by contact surface 229, the spring-loaded pin will automatically extend through the opening and engage contact surface 229, thereby locking mount 230 in the extended position.

Generally, to transition receiver 220 from the locked stowed position to the locked deployed position, receiver locking mechanism 240 is unlocked, receiver 220 is rotated from the stowed position to the deployed position, and receiver locking mechanism 240 is then locked.

FIG. 2A depicts trailer hitch 200 with receiver 220 disposed in the locked stowed position, while FIG. 2B depicts trailer hitch 200 with receiver 220 disposed in the unlocked stowed position.

To unlock receiver locking mechanism 240, lever 242 is depressed, which rotates receiver locking mechanism 240 about a rotation axis parallel to the horizontal axis and causes locking pin shoulder 247 to engage with, and move along, the inclined portion of cam surface 244. Accordingly, the rotation of receiver locking mechanism 240 is translated into the linear motion of locking pin 246 by the interaction of locking pin shoulder 247 and cam surface 244, resulting in the displacement of locking pin 246 in a direction parallel to the horizontal direction and the disengagement of locking pin 246 from contact surface 213, contact surfaces 223 and contact surface 215. The receiver and locking mechanism rotation axis, and the prescribed path followed by lever 242 from the locked stowed position to the unlocked stowed position, are depicted in dashed lines.

Spring 249 may resist the rotation of receiver locking mechanism 240 during unlocking, and may assist the rotation of receiver locking mechanism 240 during locking (under tension in the unlocked position FIG. 2D, under minimal tension or the set tension in the locked position in FIG. 2E).

FIG. 2C depicts trailer hitch 200 with receiver 220 disposed in the unlocked intermediate position in which receiver 220 has been rotated approximately 50% of the angular distance from the unlocked stowed position to the unlocked deployed position. The receiver and locking mechanism rotation axis, and the prescribed paths followed by edge 227 and lever 224 from the unlocked stowed position to the unlocked intermediate position, are depicted in dashed lines.

FIGS. 2D and 2E depict left side views of trailer hitch 200, while FIG. 2F depicts a right side view of trailer hitch 200, in accordance with embodiments of the present disclosure. Due to the change from perspective to left side view, the depth axis replaces the horizontal axis which is now perpendicular to the view.

FIG. 2D depicts trailer hitch 200 with receiver 220 disposed in the unlocked deployed position. FIG. 2E depicts trailer hitch 200 with receiver 220 disposed in the locked deployed position. The prescribed path followed by lever 224 from the unlocked deployed position to the locked deployed position, is depicted in dashed line. FIG. 2F depicts trailer hitch 200 with receiver 220 disposed in the locked deployed position.

Figure 2G:
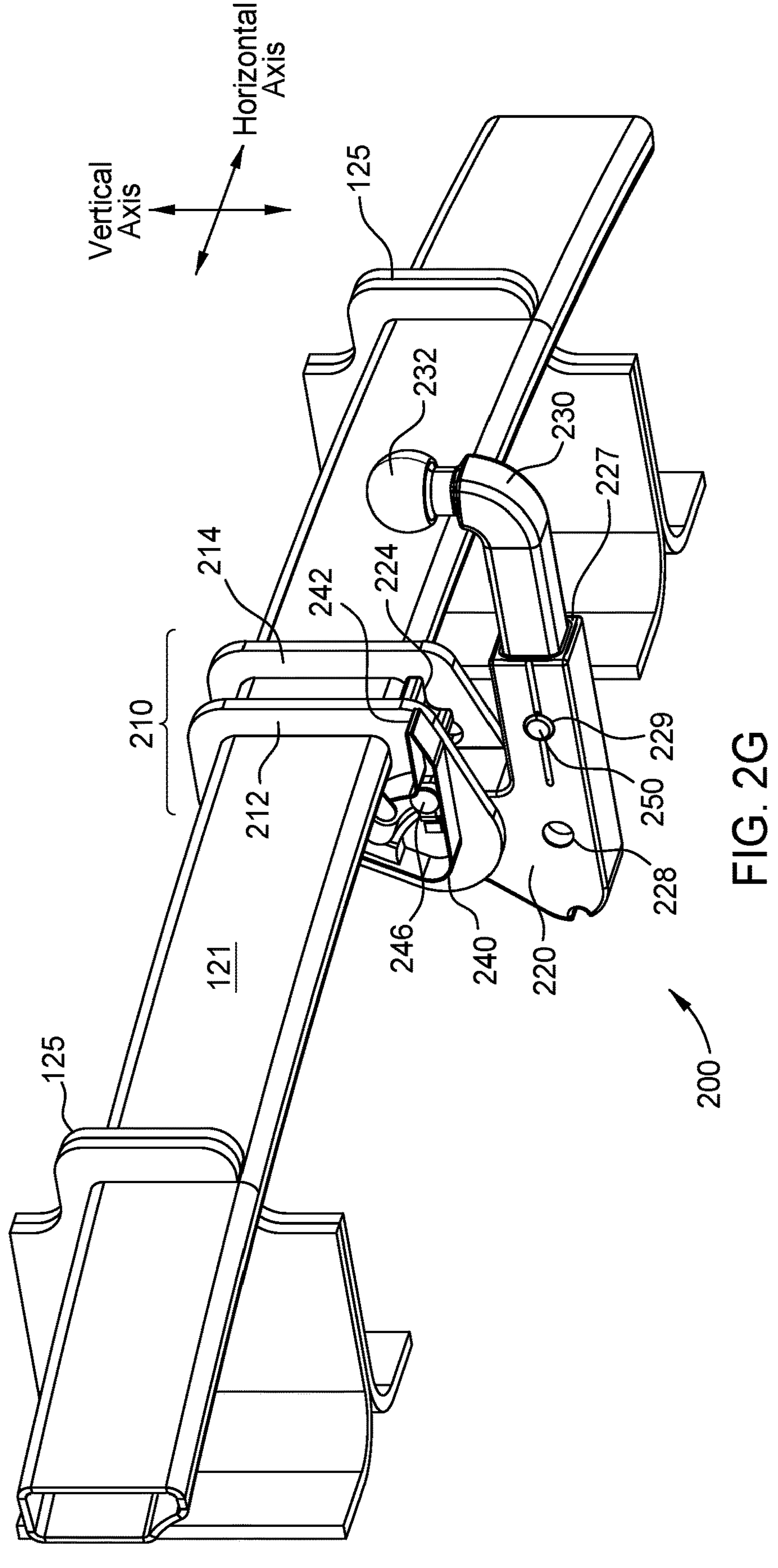
FIG. 2G depicts a front perspective view of the example trailer hitch, in accordance with embodiments of the present disclosure.

FIG. 2G depicts a front perspective view of trailer hitch 200, in accordance with embodiments of the present disclosure.

FIG. 2G depicts trailer hitch 200 with receiver 220 disposed in the locked deployed position and mount 230 disposed in the locked extended position. Bumper mounts 125 are also depicted.

Generally, to transition receiver 220 from the locked deployed position to the locked stowed position, mount locking mechanism 250 is unlocked, mount 230 is transitioned to the retracted position, mount locking mechanism 250 is locked, receiver locking mechanism 240 is then unlocked, receiver 220 is rotated from the deployed position to the stowed position, and receiver locking mechanism 240 is then locked.

In certain embodiments, mount 230 may be removed from receiver 220 after mount locking mechanism 250 is unlocked, and then stored within the vehicle or elsewhere. After mount 230 is removed from receiver 220, receiver locking mechanism 240 is unlocked, receiver 220 is rotated from the deployed position to the stowed position, and then receiver locking mechanism 240 is locked. To transition receiver 220 (without mount 230) from the locked stowed position to the locked deployed position, mount locking mechanism 250 is unlocked, receiver 220 is transitioned to the deployed position, mount locking mechanism 250 is locked, and mount 230 is then inserted into receiver 220 and locked in the extended position. In some embodiments, mount 230 includes a locked extended position only.

Figure 3A:
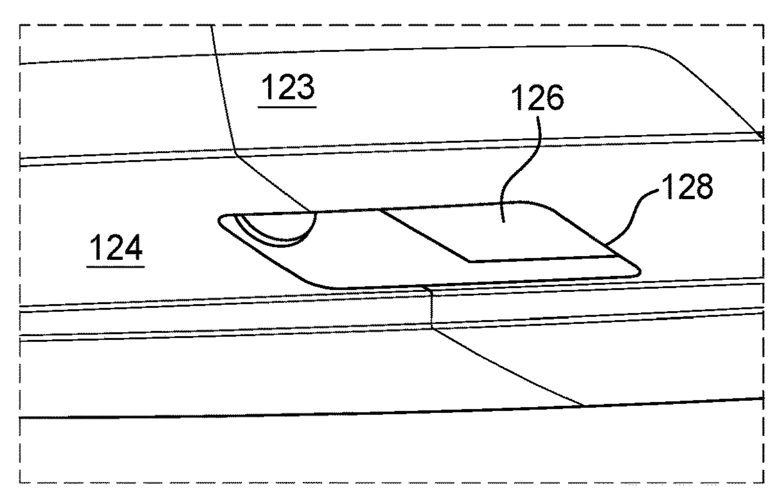
FIGS. 3A, 3B and 3C depict illustrations of a portion of a rear end of another example electric vehicle, in accordance with embodiments of the present disclosure.
Figure 3B:
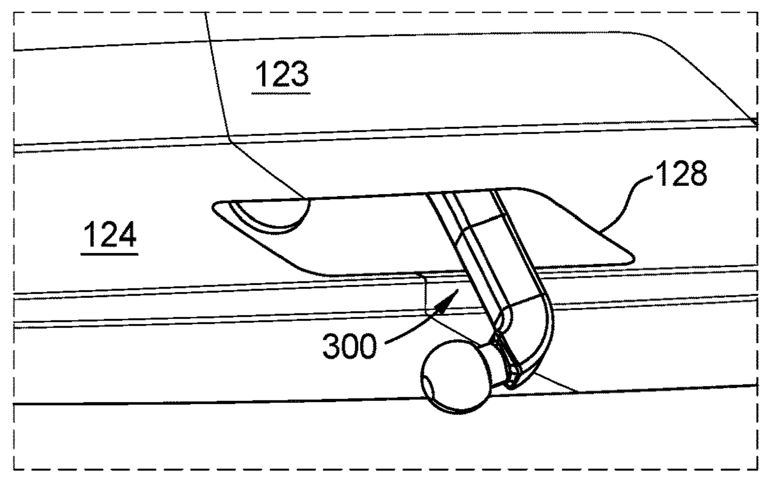
Figure 3C:
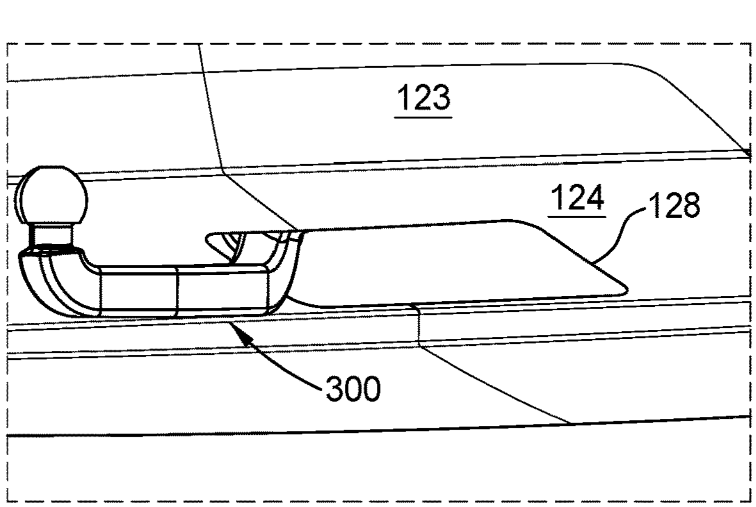

FIGS. 3A, 3B and 3C depict diagrams of a portion of rear end 118 of electric vehicle 100, in accordance with embodiments of the present disclosure. Vertical and horizontal axes are identified for reference purposes.

As discussed above, rear bumper 120 includes, inter alia, reinforcement bar 121, cover 122 which includes upper portion 123, cover lower portion 124 and motorized panel 126. Cover upper portion 123 is disposed in front of reinforcement bar 121 and is substantially parallel to the vertical axis, while cover lower portion 124 is disposed beneath the reinforcement bar and is substantially parallel to the horizontal axis.

Cover lower portion 124 defines opening 128 for trailer hitch 300. Motorized panel 126 covers (closes, shuts, seals, etc.) opening 128 when trailer hitch 300 is stowed (FIG. 3A), and uncovers (opens, unseals, etc.) opening 128 prior to (or during) trailer hitch 300 deployment (FIG. 3B). In many embodiments, motorized panel 126 remains open (i.e., uncovers opening 128) after trailer hitch 300 has been deployed (FIG. 3C). In certain embodiments, trailer hitch 300 may need a larger opening 128 through cover lower portion 124 during deployment than after deployment. For example, trailer hitch 200 may rotate through a vertical plane that is skewed with respect to reinforcement bar 121, such as a 45° skewed vertical plane (as depicted in FIGS. 3A, 3B, 3C, 4A, 4B). Accordingly, after trailer hitch 300 has been deployed, motorized panel 126 may partially close in order to partially cover opening 128.

Figure 4A:
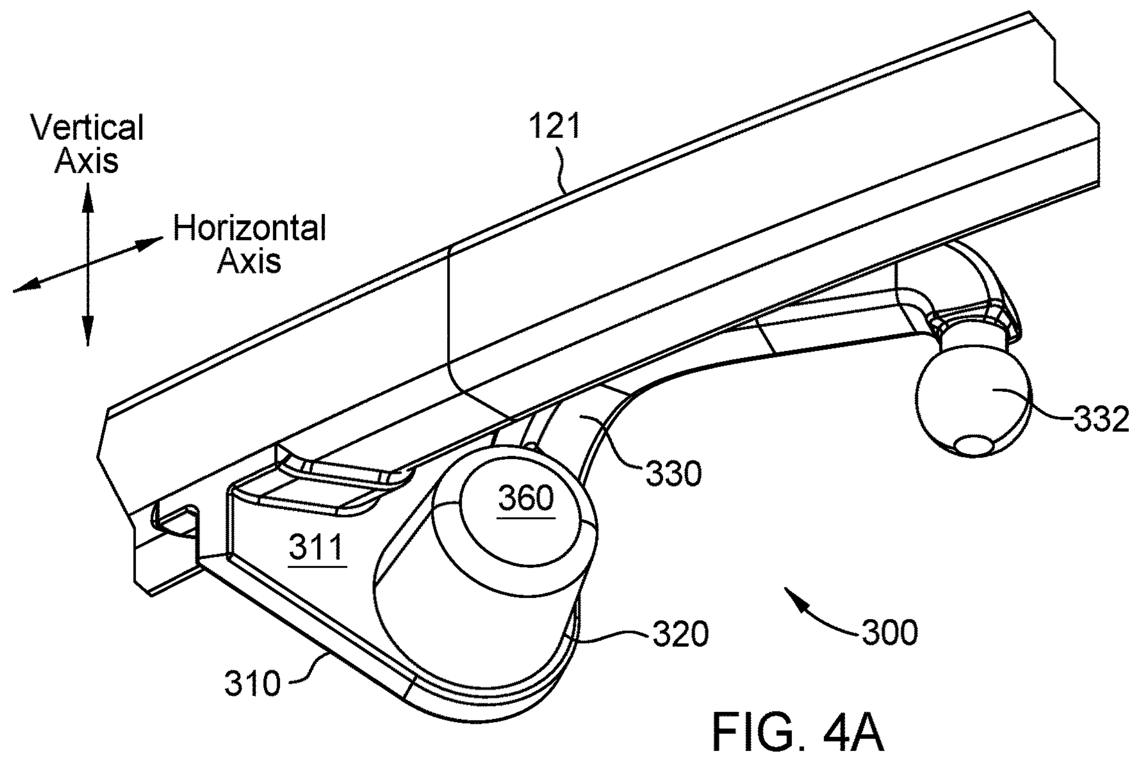
FIGS. 4A and 4B depict front perspective views of another example trailer hitch, in accordance with embodiments of the present disclosure.
Figure 4B:
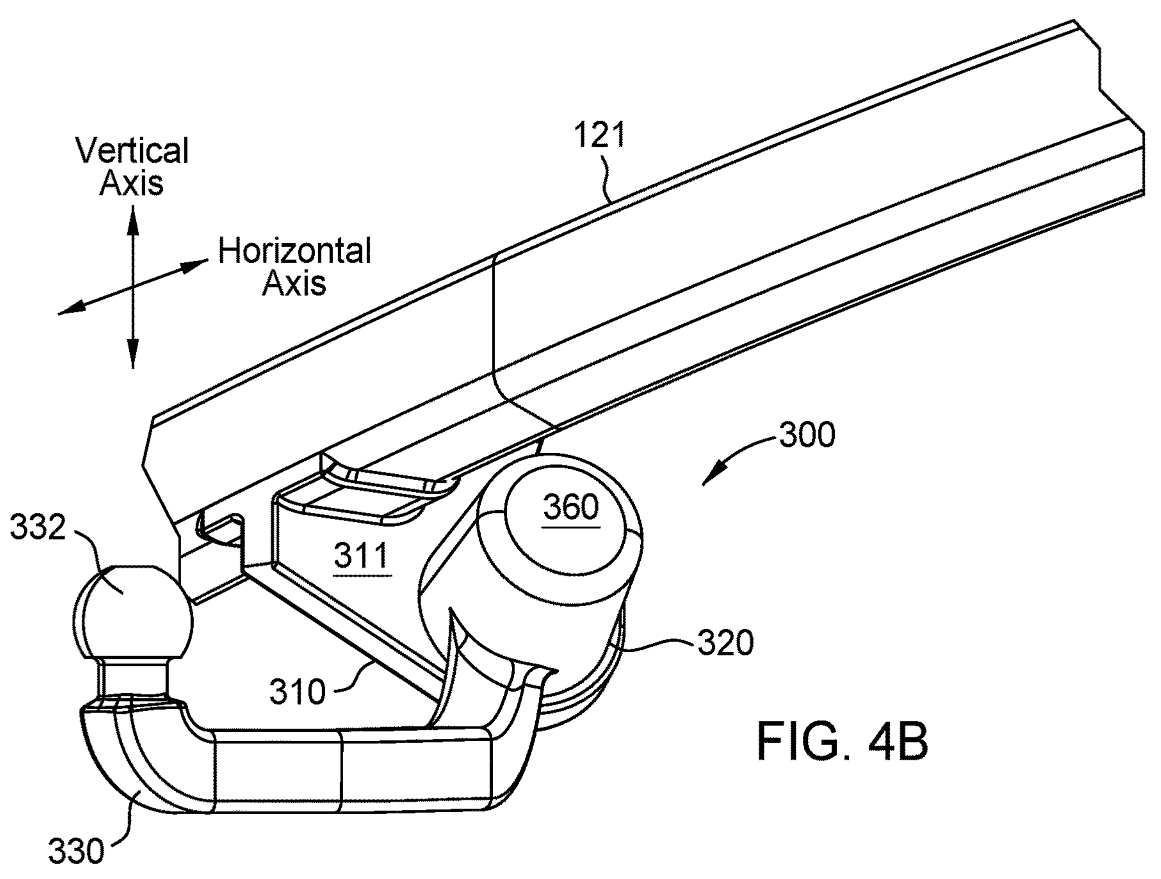

FIGS. 4A and 4B depict front perspective views of trailer hitch 300, in accordance with embodiments of the present disclosure.

Trailer hitch includes, inter alia, frame 310, receiver 320 including actuator 360 such as an electric motor, etc., and mount 330 including ball 332. Receiver 320 is attached to mounting surface 311 of frame 310, and mount 330 is coupled to receiver 320 by actuator 360. Receiver 320 has a stowed position in which actuator 360 has positioned mount 330 behind reinforcement bar 121, and a deployed position, in which actuator 360 has positioned mount 330 in front of reinforcement bar 121.

One or more commands from an ECU of electric vehicle 100 opens motorized panel 126, and activates actuator 360 to deploy trailer hitch 300. Similarly, one or more commands from the ECU activates actuator 360 to stow trailer hitch 300, and close motorized panel 126.

Generally, frame 310 may be mounted to a suitable vehicle member that is disposed behind cover upper portion 123 and above cover lower portion 124. In many embodiments, frame 310 is mounted to reinforcement bar 121 of rear bumper 120 such that mounting surface 311 is presented at an oblique angle with respect to the vertical axis, such as 45°.

FIG. 4A depicts trailer hitch 300 in the stowed position, while FIG. 4B depicts trailer hitch 300 in the deployed position.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A vehicle hitch, comprising:

- a frame configured to be mounted to a vehicle member, the frame including a first support bracket and a second support bracket;
- a receiver including:
  - an upper body rotatably coupled to the first support bracket and the second support bracket using a rotational coupling, and
  - a lower body defining an opening and an inner cavity;
- a mount slidingly disposed within the inner cavity;
- a receiver locking mechanism configured to secure the receiver in a stowed position with respect to the frame, and to secure the receiver in a deployed position with respect to the frame; and
- a mount locking mechanism configured to secure the mount with respect to the receiver,
- wherein the receiver rotates in a vertical plane about a horizontal axis.

2. The vehicle hitch of claim 1, wherein the rotational coupling is a pin.

3. The vehicle hitch of claim 1, wherein the receiver locking mechanism is rotationally coupled to the first support bracket, and is configured to rotate in the vertical plane about the horizontal axis.

4. The vehicle hitch of claim 3, wherein:

- the receiver locking mechanism includes:
  - a body having a lever and a cam surface, the body defining an opening proximate to the cam surface, and
  - a locking pin, displaceable within the opening, having a shoulder that engages the cam surface; and
- during rotation of the receiver locking mechanism, the cam surface displaces the locking pin parallel to the horizontal axis.

5. The vehicle hitch of claim 4, wherein:

- the first support bracket includes a first contact surface that defines a first opening;
- the second support bracket includes a second contact surface that defines a second opening;
- the receiver includes a first contact surface, associated with the stowed position, that defines a first recess;
- the receiver includes a second contact surface, associated with the deployed position, that defines a second recess;
- in the stowed position, the locking pin is configured to engage the first contact surface of the first support bracket, the second contact surface of the second support bracket, and the first contact surface of the receiver; and
- in the deployed position, the locking pin is configured to engage the first contact surface of the first support bracket, the second contact surface of the second support bracket, and the second contact surface of the receiver.

6. The vehicle hitch of claim 5, wherein the body of the receiver locking mechanism is retained by a first retention tab, and the locking pin is retained by a second retention tab.

7. The vehicle hitch of claim 6, wherein the receiver locking mechanism includes:

- a spring, coupled to the first support bracket and the body of the receiver locking mechanism, configured to resist rotation of the receiver locking mechanism during unlocking, and assist rotation of the receiver locking mechanism during locking.

8. The vehicle hitch of claim 1, wherein:

- the mount locking mechanism includes a captured spring-loaded pin configured to translate parallel to the horizontal axis;
- the mount locking mechanism is configured to secure the mount in a retracted position with respect to the receiver; and
- the mount locking mechanism is configured to secure the mount in an extended position with respect to the receiver.

9. The vehicle hitch of claim 8, wherein:

the lower body of the receiver has a first side and a second side;

the second side opposes the first side;

the first side defines a first opening having a first contact surface and a second opening having a second contact surface;

the second side defines a third opening having a third contact surface and a fourth opening having a fourth contact surface;

the third opening opposes the first opening, and the fourth opening opposes the second opening;

the first and third openings are associated with the retracted position, and the second and fourth openings are associated with the extended position;

the captured spring-loaded pin is configured to engage the first and third contact surfaces in the retracted position; and the captured spring-loaded pin is configured to engage the second and fourth contact surfaces in the extended position.

10. The vehicle hitch of claim 1, wherein the inner cavity of the lower body of the receiver and the mount have rectangular cross-sections.

11. The vehicle hitch of claim 1, wherein the mount includes a trailer ball.

12. A method for deploying a vehicle hitch, the method comprising:

unlocking a receiver of a vehicle hitch, wherein:

the vehicle hitch comprises a frame, the receiver, a mount, a receiver locking mechanism, and a mount locking mechanism;

the frame is configured to be mounted to a vehicle member and includes a first support bracket and a second support bracket;

the receiver includes an upper body and a lower body, the upper body is rotatably coupled to the first support bracket and the second support bracket using a rotational coupling, and the lower body defines an opening and an inner cavity;

the mount is slidingly disposed within the inner cavity;

the receiver locking mechanism is configured to secure the receiver in a stowed position with respect to the frame, and to secure the receiver in a deployed position with respect to the frame; and the mount locking mechanism is configured to secure the mount with respect to the receiver;

rotating the receiver with respect to the frame from a stowed position to a deployed position, wherein the receiver rotates in a vertical plane about a horizontal axis;

locking the receiver in the deployed position;

unlocking the mount from the receiver;

translating the mount with respect to the receiver from a retracted position to an extended position; and locking the mount in the extended position.

13. The method of claim 12, wherein:

the receiver locking mechanism includes:

a body having a lever and a cam surface, the body defining an opening proximate to the cam surface, and a locking pin, displaceable within the opening, having a shoulder that engages the cam surface;

the unlocking the receiver includes:

rotating, via the lever, the receiver locking mechanism, and displacing, via the cam surface, the locking pin to disengage the locking pin from the frame and the receiver; and the locking the receiver includes:

rotating, via the lever, the receiver locking mechanism, and displacing, via the cam surface, the locking pin to engage the locking pin to the frame and the receiver.

* * * * *